(12) United States Patent
Helsen et al.

(10) Patent No.: US 11,017,072 B2
(45) Date of Patent: *May 25, 2021

(54) SCALABLE AUTHENTICATION BETWEEN HETEROGENEOUS SERVICES

(71) Applicant: INTERNATIONAL BUSINESS MACHINES CORPORATION, Armonk, NY (US)

(72) Inventors: Simon Helsen, Komoka (CA); Nicholas R. Ibarluzea, Durham, NC (US); Ritchard L. Schacher, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/422,348

(22) Filed: May 24, 2019

(65) Prior Publication Data
US 2019/0281038 A1 Sep. 12, 2019

Related U.S. Application Data

(63) Continuation of application No. 15/584,348, filed on May 2, 2017, now Pat. No. 10,356,076.

(51) Int. Cl.
| | |
|---|---|
| *H04L 29/06* | (2006.01) |
| *G06F 21/44* | (2013.01) |
| *G06F 21/62* | (2013.01) |
| *H04L 29/08* | (2006.01) |
| *H04W 12/06* | (2021.01) |

(Continued)

(52) U.S. Cl.
CPC .......... *G06F 21/44* (2013.01); *G06F 21/6236* (2013.01); *H04L 41/0226* (2013.01); *H04L 63/08* (2013.01); *H04L 63/0823* (2013.01); *H04L 67/10* (2013.01); *H04L 67/16* (2013.01); *H04W 12/068* (2021.01); *H04W 12/069* (2021.01)

(58) Field of Classification Search
CPC .. G06F 21/6236; H04L 63/08; H04L 63/0823
See application file for complete search history.

(56) References Cited

U.S. PATENT DOCUMENTS

| | | |
|---|---|---|
| 8,250,633 B2 | 8/2012 | Vedula et al. |
| 10,356,076 B2 | 7/2019 | Helsen |

(Continued)

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Olugbenga O Idowu
(74) *Attorney, Agent, or Firm* — Michael O'Keefe; George S. Blasiak; Heslin Rothenberg Farley & Mesiti PC

(57) ABSTRACT

Methods, computer program products, and systems are presented. The methods include, for instance: receiving a request for a private credential of a first service of the two or more services from the first service, generating the private credential of the first service based on identity information of the first service, storing the private credential of the first service and the identity information of the first service in a local database, and sending the private credential of the first service to the first service for secure communication from the first service.

20 Claims, 5 Drawing Sheets

(51) Int. Cl.
*H04W 12/069* (2021.01)
*H04L 12/24* (2006.01)

(56) References Cited

U.S. PATENT DOCUMENTS

| | | | |
|---|---|---|---|
| 2009/0007069 | A1 | 1/2009 | Bliven, II et al. |
| 2012/0144365 | A1 | 6/2012 | Chrysanthakopoulos et al. |
| 2015/0149978 | A1* | 5/2015 | Kim .................... G06F 8/20 717/101 |
| 2016/0248869 | A1 | 8/2016 | Allen |
| 2017/0317817 | A1* | 11/2017 | Kravitz ................ H04L 9/006 |
| 2018/0300181 | A1* | 10/2018 | Hetzel ................ G06F 9/5055 |
| 2018/0324254 | A1 | 11/2018 | Helsen |
| 2018/0324256 | A1 | 11/2018 | Helsen |

OTHER PUBLICATIONS

List of IBM Patent and/or Patent Applications treated as related for U.S. Appl. No. 16/422,348, filed May 24, 2019, dated Oct. 30, 2019.

Mulet. Phillipe. "Custom toolchains in one click with IBM Bluemix DevOps Services" [retrieved from the Internet Mar. 1, 2017]. Retrieved from Internet URL: <https://developer.ibm.com/devops-services/2016/06/16/open-toolchain-with-ibm-bluemix-devops-services/>, Jun. 16, 2016, 15 pgs.

Johnson, Dave, et al., "Open Services for Lifecycle Collaboration Core Specification Version 2.0" [retrieved from the Internet Feb. 27, 2017]. Retrieved from Internet URL: <http://open-services.net/bin/view/Main/OslcCoreSpecification#Authentication>, 34 pgs.

"Service Broker API v2.11" [retrieved from the Internet Apr. 12, 2017]. Retrieved from Internet URL: <https://docs.cloudfoundry.org/services/api.html#authentication>, Cloud Foundry Documentation © 2017 Cloud Foundry Foundation, 19 pgs.

WIKIPED1A, "Public-key cryptography" [page last modified Mar. 28, 2017]. Retrieved from the Internet URL: <https://en.wikipedia.org/wilci/Public-key_cryptography>, 14 pgs.

Freier, A., et al., "The Secure Sockets Layer (SSL) Protocol Version 3.0" [retrieved from the Internet Apr. 12, 2017]. Retrieved from Internet URL: <https://tools.ietf.org/pdf/rfc6101.pdf>, Internet Engineering Task Force (IETF), Aug. 2011, 67 pgs.

Non-Final Rejection, U.S. Appl. No. 15/584,348, filed May 2, 2017, dated Dec. 6, 2018.

Applicant's Response to Non-Final Rejection, U.S. Appl. No. 15/584,348, filed May 2, 2017, dated Jan. 31, 2019.

Notice of Allowance, U.S. Appl. No. 15/584,348, filed May 2, 2017, dated Mar. 4, 2019.

* cited by examiner

SCALABLE AUTHENTICATION BETWEEN HETEROGENEOUS SERVICES

CROSS-REFERENCE TO RELATED APPLICATION

This application is a continuation of U.S. application Ser. No. 15/584,348, filed May 2, 2017, titled "Scalable Authentication Between Heterogeneous Services", which is incorporated by reference herein in its entirety.

STATEMENT REGARDING PRIOR DISCLOSURES BY THE INVENTOR OR A JOINT INVENTOR

Aspects of the present invention have been disclosed by another, who obtained the subject matter disclosed directly from the inventors, in the product IBM DS8870, made available to the public on Dec. 5, 2014. These aspects, as they may appear in the claims, may be subject to consideration under 35 U.S.C. § 102(b)(1)(A).

TECHNICAL FIELD

The present disclosure relates to authentication technology, and more particularly to methods, computer program products, and systems for authenticating software tools in a secure and scalable manner.

BACKGROUND

With conventional authentication methods, reliably verifying identities of varying software tools in a development environment is difficult to achieve due to the volatile nature of software tools with respect to respective status and number of the tools involved, and runtime environments. Moreover, a tradeoff between efficiency and security is often a challenge for authentication protocols, particularly in modern application development trends.

SUMMARY

The shortcomings of the prior art are overcome, and additional advantages are provided, through the provision, in one aspect, of a method. The method for authenticating two or more services for communication includes, for example: receiving, by one or more processor, a request for a private credential of a first service of the two or more services from the first service, wherein the request includes identity information of the first service; generating, by the one or more processor, the private credential of the first service based on the identity information of the first service, wherein the private credential of the first service is encrypted for a secure transfer; storing, by the one or more processor, a key for the private credential of the first service in a local database; and sending, by the one or more processor, the private credential of the first service to the first service such that the first service may securely communicate with another service of the two or more services by use of the private credential of the first service. The shortcomings of the prior art are overcome, and additional advantages are provided through the provision, in one aspect, of a method. The method can include, for example, generating a service credential for a service instance of a first service, upon being informed, by a fabric, that the fabric will provision the first service; generating a toolchain credential for a toolchain to which the instance of the first service will be bound, upon being informed by the fabric that the fabric will bind the service instance to the toolchain; and storing respective keys for the service credential and the toolchain credential for the first service in a local database.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
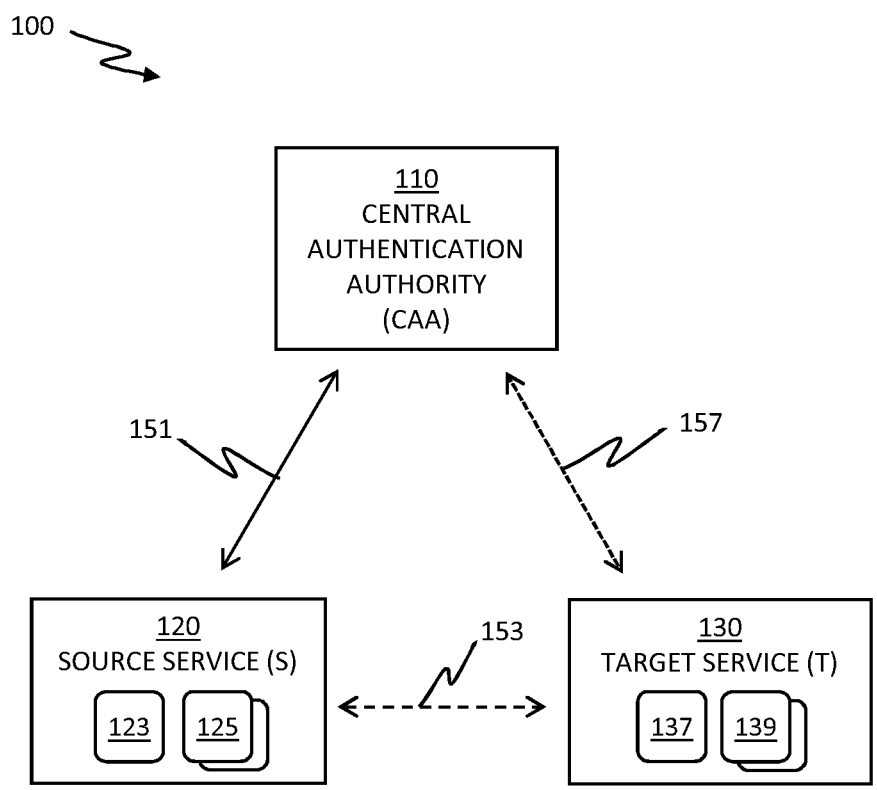
FIG. 1 depicts a service ecosystem for authenticating services by use of a central authentication authority, in accordance with one or more embodiments set forth herein.

FIG. 1 depicts a service ecosystem 100 for authenticating services by use of a central authentication authority (CAA) 110, in accordance with one or more embodiments set forth herein.

The service ecosystem 100 includes the central authentication authority (CAA) 110, and two or more services. The entities of the service ecosystem 100 including the CAA 110 and the two or more services are coupled via various types of network and may be reached to one another for communication. The CAA 110 authenticates the two or more services of the service ecosystem 100 by generating various credentials and by authenticating inquiries on the credentials such that the two or more services of the service ecosystem 100 may communicate securely.

In certain embodiments of the present invention, the two or more services collectively indicate component services offered for cloud computing and/or mobile computing in order to achieve an agile software development practice referred to as continuous delivery (CD). In CD, numerous techniques such as continuous testing, continuous integration, and continuous deployment are utilized to rapidly and safely package and deploy new features and fixes for test environments and ultimately to users. Accordingly, application development of a software and operations thereof are integrated and referred to as DevOps in a software lifecycle. The component services of the service ecosystem 100 indicate respective functionalities that are ready for use, such as database, messaging, web software for running code, deployment, application management, monitoring capabilities, data analysis and evaluation, etc. The component services of the service ecosystem 100 correspond to respective software tools.

The software tools providing respective component services may participate in a set of tools used to develop a software product or to perform a complex task for software development, referred to as a toolchain. The toolchain enables integration of tools and messaging amongst the tools of the toolchain in order to provide automated provisioning and configuration of the tools of the toolchain in the CD context. In this specification, term "provisioning" indicates a process of making computing resources available to entities including users, processes, services, etc., for usage. The computing resources may include servers, processing time, software, networks, and/or storage space, etc. Also in this specification, term "deprovisioning" indicates a process reverse to the provisioning, which takes accesses to the resources from the entities or otherwise makes the resources not available to the entities.

The toolchain has many utilities in varying contexts. For example, by use of the toolchain, certain events affecting tools, such as code commits in a repository tool, build results and/or failures in a continuous integration tool, etc., may trigger respective notifications to be posted to a persistent chat channel tool in a programmer community blog and/or a team of programmers such that the programmers may be informed of the changes on the tools in the toolchain, as resulting from the events. For another example, with a specific type of toolchain in a certain environment, programmers may use a template to create an online store that consists of three element services: a merchandise catalog application programming interface (API), an orders API, and a user interface that calls both the catalog API and the orders API. This type of toolchain may be preconfigured for continuous delivery, source control, functional testing, issue tracking, online editing, alert notification, etc. For still another example, a toolchain for developing a simple software product may include, a compiler and linker that generates a computer-executable program from human-readable source code, libraries providing interfaces to an operating system in which the program would be running, and a debugger that is used to test the generated programs for errors and to correct the errors.

A source service (S) 120 of the service ecosystem 100 includes a private credential 123 and one or more target credentials including a target credential 125. Arrow 151 indicates that the service S 120 requests the private credential 123 from the CAA 110 and receives the private credential of S 123 in response. The private credential of S 123 uniquely identifies the service S 120 with the CAA 110 amongst the two or more services of the service ecosystem 100. Arrow 151 further indicates that the service S 120 requests the target credential for T 125 from the CAA 110 by use of the private credential of S 123 and receives the target credential for T 125 in response. The target credential for T 125 identifies the service T 130 as a communication counterpart of the service S 120, and may only be used by the service S 120 in accessing protected resources of the service T 130. The service S 120 may not use the target credential for T 125 in accessing any entities other than the service T 130. The target credential for T 125 of the service S 120 is valid during both the service S 120 and the service T 130 are available and present in the service ecosystem 100. Similar with the private credential 123, only the CAA 110 may decrypt the target credential for T 125 or otherwise resolve the communicating parties designated by the target credential 125.

Similarly, a target service (T) 130 of the service ecosystem 100 includes a private credential 137 and one or more target credentials including a target credential 139. Arrow 157 indicates that the service T 130 requests the private credential 137 from the CAA 110 and receives the private credential of T 137 in response. The private credential of T 137 uniquely identifies the service T 130 with the CAA 110 amongst the two or more services of the service ecosystem 100. For communications initiated by the service T 130, the target credential of T 139 specifies a communication counterpart of T 130, and may only be used by the service T 130. As noted for the target credential for T 125 of the service S 120, the target credential may only be used by a service initiated the CAA 110, and only for a target whose identity has been specified in the request to CAA 110. As a target credential is unidirectional, having a source and a target specified, the target credential may not be used in communication from the target to the source.

The service S 120 initiates communication with the service T 130 by sending a message with the target credential for T from S 125, as represented by arrow 153. The service T 130 subsequently authenticate the target credential for T from S 125 by use of the CAA 110, as represented by arrow 157. If the CAA 110 verifies the target credential for T from S 125 by use of the CAA 110, as represented by arrow 157, then the service T 130 responds to the service S 120, as represented by arrow 153. Details of the authentication protocol as performed by the service S 120, the service T 130, and the CAA 110 are presented in FIG. 2 and corresponding description.

A source service, as represented by the service S 120, may be an individual service initiating communication with another individual service, a target service, as represented by the service T 130. An embodiment of the system 100 in IBM Bluemix DevOps context is presented in FIG. 3 and corresponding description.

Conventional authentication utilizes credentials, tokens, keys, etc., to guarantee the identity of a sender/receiver to the other party. In contrast with certificates valid for a limited period of time until certain expiration dates as used in Public key encryption and SSL-like protocols, certain embodiments of the present invention utilize credentials without predefined effective dates because a receiver of a message may check the validity of the credentials with the CAA 110. Further, authentication between tools involves management of credentials and guaranteeing secure communications between the tools in the context of automatic provisioning of services and current membership status of tools to a toolchain. Details with respect to types and lifecycles of credentials are presented in FIG. 3 and corresponding description.

Figure 2:
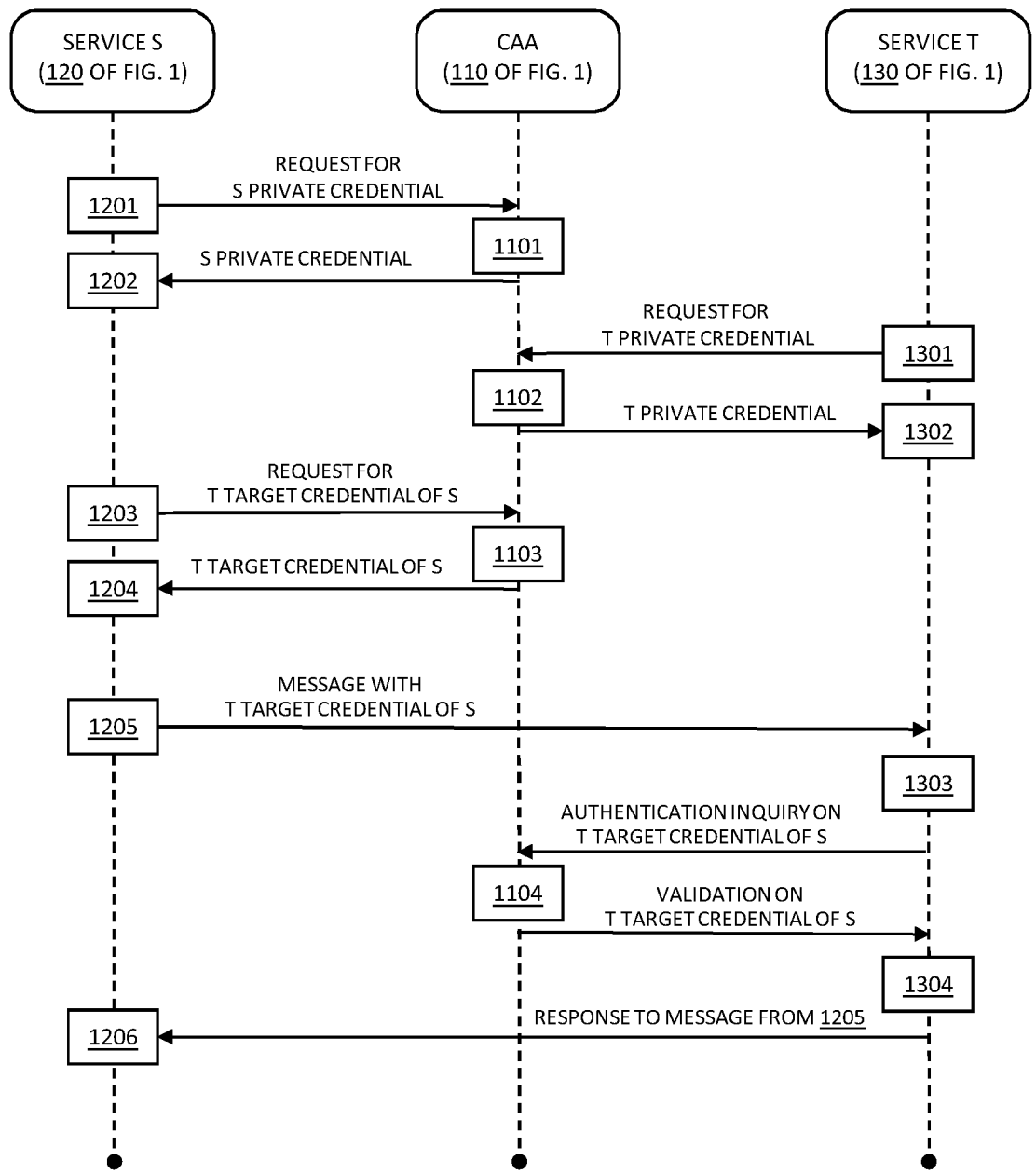
FIG. 2 depicts an authentication protocol as performed amongst the central authentication authority, the source service, and the target service, in accordance with one or more embodiments set forth herein.

FIG. 2 depicts an authentication protocol as performed amongst the central authentication authority (CAA) 110, the source service S 120, and the target service T 130 of FIG. 1, in accordance with one or more embodiments set forth herein.

In block 1201, the service S 120 sends a request for a private credential of S to the CAA 110 in order to participate in secure communications amongst the service ecosystem 100 as governed by the CAA 110.

In block 1101, responsive to the request from block 1201, the CAA 110 generates the private credential of S by encrypting identity/login information of the service S 120 such as a service identifier, a service name, a password, etc. The CAA 110 stores a key for the private credential of S in a secure local database and sends the private credential of S to the service S 120. In certain embodiments of the present invention, the CAA 110 keeps the private credential as generated in any other secure manner that can only be decoded by the CAA 110, as well as all records required to authenticate the services in the service ecosystem 100. In this specification, "the secure local database" indicates a secure data repository for keeping keys for respective credentials and/or credentials as generated. The secure data repository leading to the credentials is only accessible by the CAA 110.

In certain embodiments of the present invention, the CAA 110 may utilize a standard symmetric cryptography algorithm, an opaque key method, etc., in encrypting plaintext identity information to various credentials and decrypting various credentials to corresponding plaintext identity information. The credentials generated by the CAA 110 are not meaningful to any other entities, and all credentials are resolved by the CAA 110.

In block 1202, responsive to block 1101, the service S 120 receives the private credential of S from the CAA 110. The service S 120 uses the private credential of S to identify itself in communicating with the CAA 110.

In certain embodiments of the present invention, the private credential has two types of credentials. As noted, respective services correspond to each software tool. A service credential is for provisioning a service offered by a tool, and a toolchain credential is for associating a service to a toolchain. Details of the embodiments regarding private credentials are presented in FIG. 3 and corresponding description.

In block 1301, the service T 130 sends a request for a private credential of T to the CAA 110 in order to participate in secure communications amongst the service ecosystem 100 as governed by the CAA 110.

In block 1102, responsive to the request from block 1301, the CAA 110 generates the private credential of T by encrypting identity information of the service T 130. The CAA 110 stores a key for the private credential of T in the secure local database and sends the private credential of T to the service T 130.

In block 1302, responsive to block 1102, the service T 130 receives the private credential of T from the CAA 110. The service T 130 uses the private credential of T to identify itself in communicating with the CAA 110.

In block 1203, based on that the service T 130 is registered with the CAA 110, the service S 120 sends a request for a target credential to communicate with the service T to the CAA 110. The request for the target credential for T from S includes the private credential of S such that the CAA 110 securely authenticates the service S 120.

In block 1103, responsive to the request from block 1203, the CAA 110 generates the target credential for T from S by encrypting identity information of the service S 120 and the service T 130 specified as the other party of the communication initiated by the service S 120. The CAA 110 sends the target credential for T from S to the service S 120.

In block 1204, responsive to block 1103, the service S 120 receives the target credential for T from S from the CAA 110. The service S 120 may communicate with the service T by use of the target credential for T from S.

In block 1205, the service S 120 sends a message to the service T 130 by use of the target credential for T from S that has been received in block 1204. The message may include the target credential as a parameter or payload of the message.

In block 1303, upon receiving the message from the service S 120 in block 1205, the service T 130 sends an inquiry on the target credential for T from S of the message to the CAA 110.

In block 1104, responsive to the inquiry from the service T 130 in block 1303, the CAA 110 decrypts the target credential for T from S and checks the secure local database. If the CAA 110 discovers the target credential for T from S in the secure local database, then the CAA 110 authenticates the target credential for T from S and identifies the sender as the service S 120, guaranteeing the service T that the target credential for T from S is valid and informing the identity of the sender of the target credential. If the CAA 110 fails to discover the target credential for T from S in the secure local database, then the CAA 110 repudiates the target credential for T from S by notifying the service T that the target credential for T from S is invalid and not to be used for a secure communication.

The CAA 110 keeps the credentials up to date with the respective status of each service, and any credentials corresponding to a deprovisioned, unbound, or otherwise invalidated service would be removed from the secure local database. The CAA 110 specifies a pair of unique source and target in the target credential, such that the target credential for T from S may only be used when both S and T are valid services and the service S 120 sends the target credential to the service T 130.

In block 1304, responsive to block 1104 by the CAA 110, the service T 130 receives a validation of the target credential for T from S in the message from the service S 120 and identifies the sender of the message as the service S 120. The service T 130 accordingly sends a response to the service S 120 as the message is authentic and the sender has been identified.

In block 1206, responsive to block 1304 by the service T 130, the service S 120 receives the response to the message sent in block 1205. The service T 130 would authenticate the target credential from the service S 120 with the CAA 110 in a manner similar to blocks 1303 through 1304.

Figure 3:
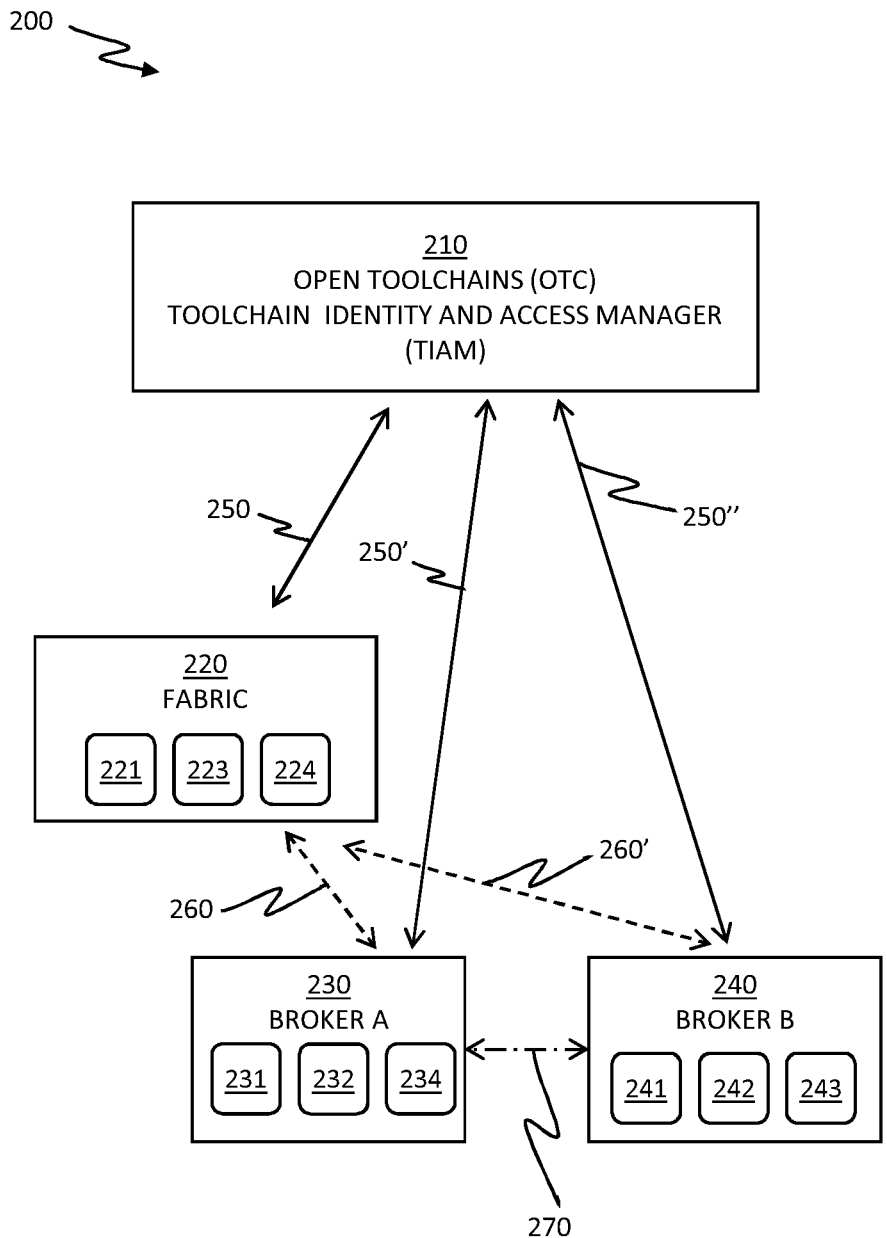
FIG. 3 depicts an exemplary embodiment of the service ecosystem, in accordance with one or more embodiments set forth herein.

FIG. 3 depicts an exemplary embodiment of the service ecosystem 100 of FIG. 1, in accordance with one or more embodiments set forth herein.

An Open Toolchain (OTC) ecosystem 200 depicts an exemplary elements and operations. The OTC ecosystem 200 includes OTC Toolchain Identity and Access Manager (TIAM) 210, a fabric 220, a broker A 230, and a broker B 240. The TIAM 210 implements the central authentication authority (CAA) 110 of FIG. 1, generating credentials, and authenticating the credentials in order to facilitate secure communications amongst the fabric 220, the broker A 230, and the broker B 240.

The fabric 220 indicates an entity facilitating tool lifecycle by negotiating private credentials respective to the brokers, 230 and 240, with the TIAM 210. When the fabric 220 is registered, the TIAM 210 generates a TIAM client credential of the fabric 221 identifying the fabric 220 in the OTC ecosystem 200. When the fabric 220 has a message for the broker A 230, the fabric 220 requests a target credential from the fabric to the broker A 223 to the TIAM 210, and receives and uses the target credential from the fabric to the broker A 223 in communicating with the broker A 230. Similarly, when the fabric 220 has a message for the broker B 240, the fabric 220 requests a target credential from the fabric to the broker B 224 to the TIAM 210, and receives and uses the target credential from the fabric to the broker B 224 in communicating with the broker B 240.

The broker A 230 indicates one of the tools participating in the OTC toolchain. In order for the broker A 230 to participate in the OTC toolchain, a service instance of the broker A 230 needs to be provisioned and then bound to the OTC toolchain.

The fabric 220 first notifies the TIAM 210 that the fabric 220 provisions a service instance corresponding to the broker A 230 and receives a service credential generated by the TIAM 210 responsive to the provision notice, as represented by arrow 250. The fabric 220 subsequently informs the broker A 230 of the service credential of the service instance as generated by the TIAM 210; the broker A 230 finishes the provisioning operation accordingly, and reports a successful provisioning of the service instance to the fabric 220, as represented by arrow 260.

The fabric 220 notifies the TIAM 210 that the fabric 220 will bind the provisioned service instance of the broker A 230 to the OTC toolchain; the TIAM 210 generates and returns a toolchain credential to the fabric, responsive to the binding notice, as represented by arrow 250. The fabric 220 subsequently informs the broker A 230 of the toolchain credential of the service instance as generated by the TIAM 210; the broker A 230 finishes the binding operation accordingly, and reports a successful binding of the service instance with the OTC toolchain to the fabric 220, as represented by arrow 260.

Subsequent to provisioning and binding, the broker A 230 includes a private credential 231 that may include the service credential and/or the toolchain credential as generated by the TIAM 210. The broker A 230 may use the service credential to communicate individually, or use the toolchain credential to communicate via the toolchain. By use of the private credential 231, the broker A 230 may securely communicate with the TIAM 210 to authenticate other entities of the OTC ecosystem 200.

Similarly, the broker B 240 includes a private credential 241 comprising a service credential and a toolchain credential as generated by the TIAM 210, as facilitated by the fabric 220 with the provisioning and the binding with the toolchain, as represented by arrows 250 and 260'.

In order for the broker A 230 to communicate with the broker B 240, the broker A 230 requests a target credential from the broker A to the broker B 234 to the TIAM 210 by identifying the source as itself with the private credential 231 and the target as the broker B 240 by a plaintext identifier for the broker B 240, as represented by arrow 250'. The TIAM 210 authenticates the broker A 230 by the previously generated private credential of the broker A 231, generates, and subsequently sends to the broker A 230, the target credential from the broker A to the broker B 234 according to the information sent from the broker A 230, as represented by arrow 250'. The broker A 230 subsequently sends the broker B 240 a message with the target credential from the broker A to the broker B 234, as represented by arrow 270.

When the broker B 240 receives the message with the target credential from the broker A to the broker B 234, the broker B 240 makes an authentication inquiry on the target credential from the broker A to the broker B 234, as represented by arrow 250". If the TIAM 210 authenticates the target credential in the message and identifies the sender of the message as the broker A 230, then the broker B 240 responds to the message by sending a response to the broker A 230.

In order for the broker A 230 to communicate with the fabric 220, the broker A 230 requests a target credential from the broker A to the fabric 232 to the TIAM 210 by identifying the source as itself with the private credential 231 and the target as the fabric 220 by a plaintext identifier for the fabric 220, as represented by arrow 250'. The TIAM 210 authenticates the broker A 230 by the previously generated private credential of the broker A 231, generates, and subsequently sends to the broker A 230, the target credential from the broker A to the fabric 232 according to the information sent from the broker A 230, as represented by arrow 250'. The broker A 230 subsequently sends the fabric 220 a message with the target credential from the broker A to the fabric 232, as represented by arrow 260.

When the fabric 220 receives the message with the target credential from the broker A to the fabric 232, the fabric 220 makes an authentication inquiry on the target credential from the broker A to the fabric 232, as represented by arrow 250. If the TIAM 210 authenticates the target credential in the message, then the fabric 220 responds to the message from the broker A 230, as the sender of the message, that is, the broker A 230, is authenticated by the TIAM 210.

Similarly, in order for the broker B 240 to communicate with the fabric 220, the broker B 240 requests a target credential from the broker B to the fabric 242 to the TIAM 210 by identifying the source as itself with the private credential 241 and the target as the fabric 220 by a plaintext identifier for the fabric 220, as represented by arrow 250". The TIAM 210 authenticates the broker B 240 by the previously generated private credential of the broker B 241, generates, and subsequently sends to the broker B 240, the target credential from the broker B to the fabric 242 according to the information sent from the broker B 240, as represented by arrow 250". The broker B 240 subsequently sends the fabric 220 a message with the target credential from the broker B to the fabric 242, as represented by arrow 260'.

Similarly, in order for the broker B 240 to communicate with the broker A 230, the broker B 240 acquires a target credential from the broker B to the broker A 243 from the TIAM 210, as represented by arrow 250".

In order for the fabric 220 to communicate with the broker B 240, the fabric 220 requests a target credential from the fabric to the broker B 224 to the TIAM 210 by identifying the source as itself with the TIAM client credential 221 and the target as the broker B 240 by a plaintext identifier for the broker B 240, as represented by arrow 250. The TIAM 210 authenticates the fabric 220 by use of the previously generated TIAM client credential 221 of the fabric 220, generates, and subsequently sends to the fabric 220, the target credential from the fabric to the broker B 224 according to the information sent from the fabric 220, as represented by arrow 250. The fabric 220 subsequently sends the broker B 240 a message with the target credential from the fabric to the broker B 224, as represented by arrow 260'.

When the broker B 240 receives the message with the target credential from the fabric to the broker B 224, the broker B 240 makes an authentication inquiry on the target credential from the fabric to the broker Bo 224, as represented by arrow 250". If the TIAM 210 authenticates the target credential in the message, then the broker B 240 responds to the message from the fabric 220, as the sender of the message, that is, the fabric 220, is authenticated by the TIAM 210.

To exclude the broker A 230 from the OTC ecosystem 200, the fabric 220 first unbinds the service instance of the broker A 230 from the OTC toolchain, and then deprovisions the service instance of the broker A 230. Accordingly, the association between the service credential and the toolchain credential generated for the broker A 230 is removed from the TIAM 210, the service credential of the service instance of the broker A 230 is removed from the TIAM 210, and consequently the private credential 231 of the broker A 230 may not be used by other entities.

In the DevOps embodiments of the present invention, service instances of a tool may have distinctive configurations as in a GitHub repository, a Slack channel, etc. In contrast with a User Account and Authentication Service (UAA) bearer token in conventional authentication methods, toolchain credentials may be used to authenticate only entities/service instances for which the toolchain credentials are generated.

In the same embodiment, the TIAM 210 communicates with entities of the OTC ecosystem 200 via Open Toolchain Application Programming Interface (OTC API), in which exchanges on authentication may be securely communicated. In the same embodiment, the OTC API may be implemented as a Representational State Transfer (REST) system.

Certain embodiments of the present invention may offer various technical computing advantages, including scalable authentication amongst varying types of service tools. The authentication method facilitates dynamic participations to and departures from the ecosystem of the service tools. A central authentication authority generates private credentials for respective entities, which may not be decrypted by other entities. By use of a hierarchy in types of private credentials, the authentication automatically handles provisioning/deprovisioning of services and binding/unbinding of the services with the toolchain. A target credential specifies a pair of communication counterparts as well as a direction of the message such that a source and a target may securely communicate by use of the target credential with security limitations. Consequently, a risk associated with breaches of the credentials are inherently limited unlike other conventional token authentication, as the credentials have limited usages and would not survive the service tools involved, either a source or a target. Certain embodiments of the present invention may be implemented by use of a cloud platform/data center, and the authentication may be provided as a subscribed service for organizational clients. Certain embodiments of the present invention improves the effectiveness, scalability, and risk factor of conventional authentication particularly in the context of continuous delivery wherein development and operations of a software system are integrated.

Figure 4:
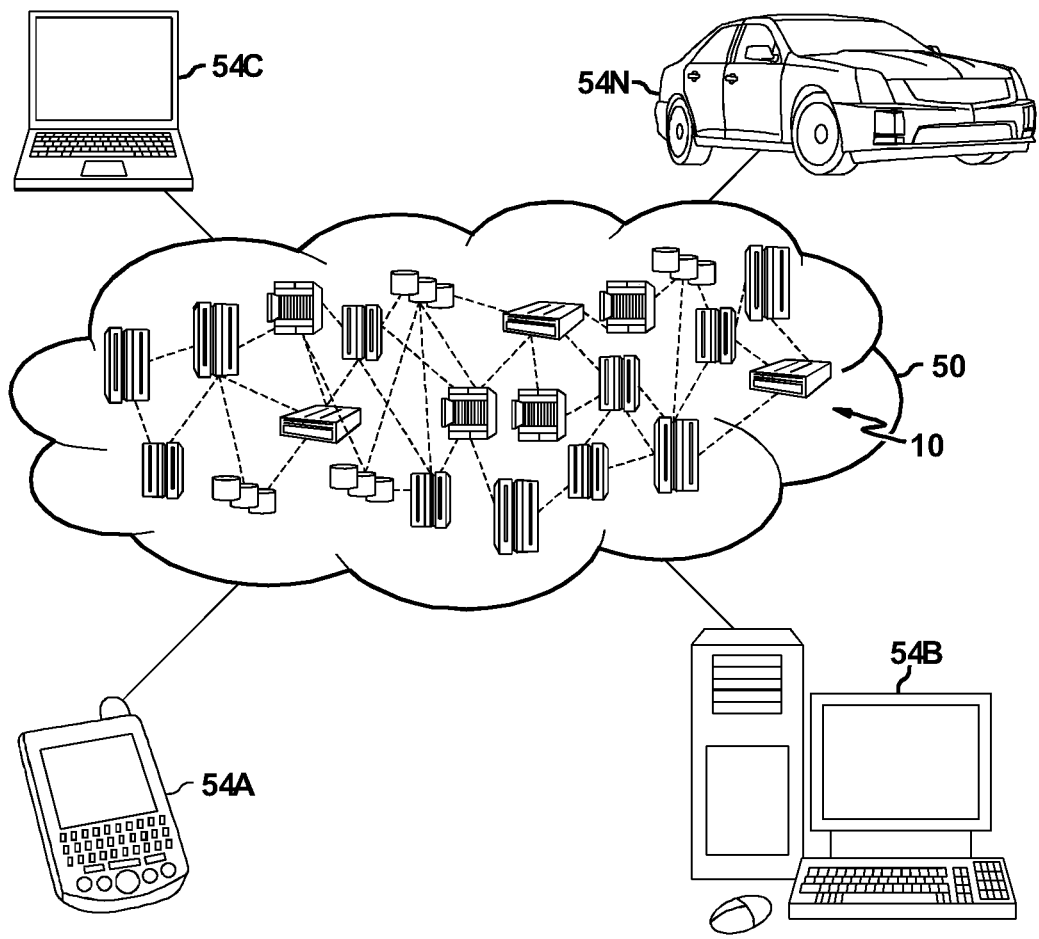
FIG. 4 depicts a cloud computing environment according to an embodiment of the present invention.
Figure 5:
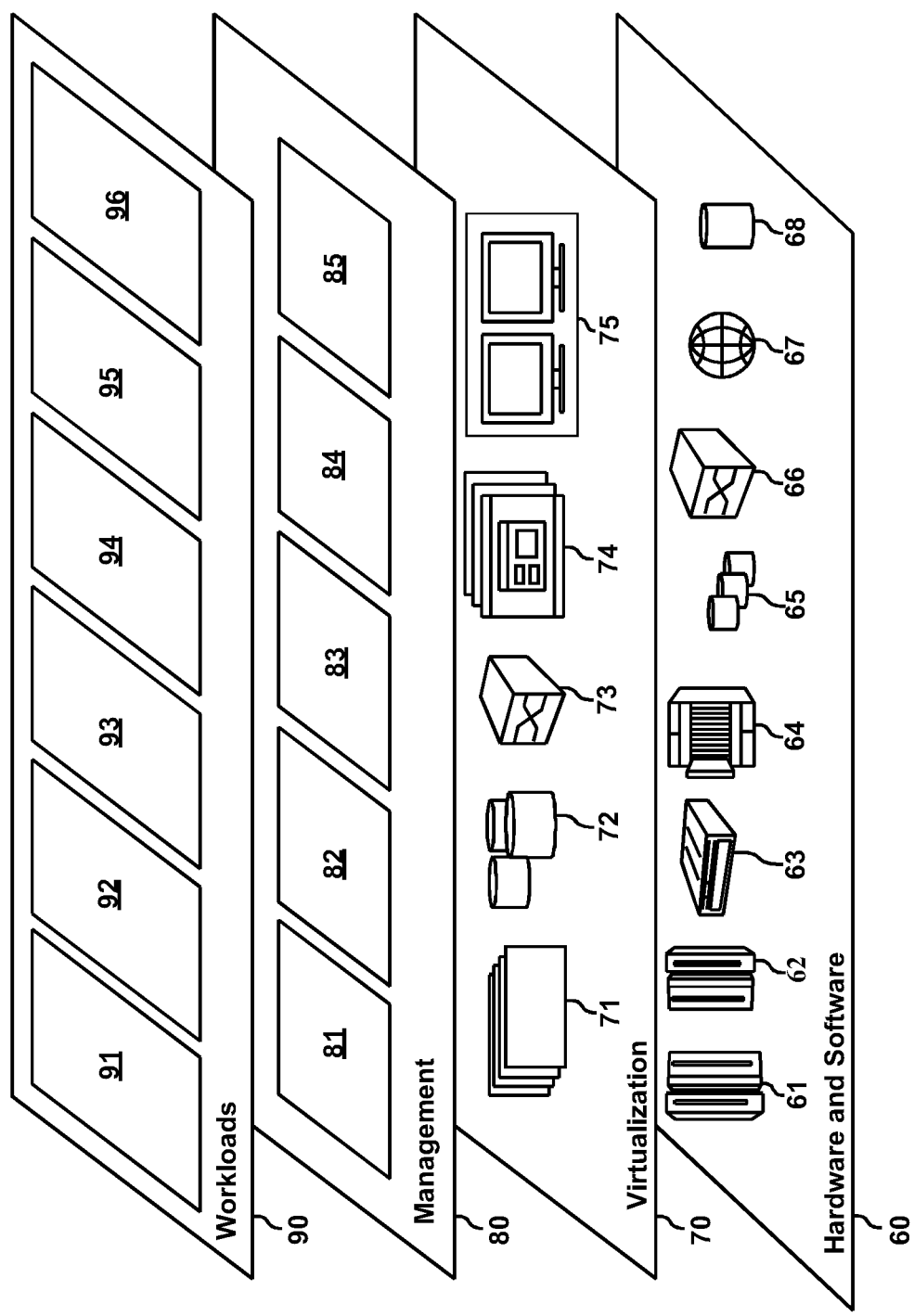
FIG. 5 depicts abstraction model layers according to an embodiment of the present invention.

FIGS. 4-5 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the central authentication authority and services of the ecosystem 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   generating a service credential for a service instance of a first service, upon being informed, by a fabric, that the fabric will provision the first service;
   generating a toolchain credential for a toolchain to which the instance of the first service will be bound, upon being informed by the fabric that the fabric will bind the service instance to the toolchain; and
   storing respective keys for the service credential and the toolchain credential for the first service in a local database.

2. The computer implemented method of claim 1, wherein a private credential of the first service includes the service credential and the toolchain credential.

3. The computer implemented method of claim 1, further comprising: invalidating an association between the service credential and the toolchain credential, the service instance corresponding to the service credential, the service instance of the first service being bound to the toolchain corresponding to the toolchain credential, upon being informed by the fabric that the fabric will unbind the service instance of the first service from the toolchain; and invalidating the service credential corresponding to the service instance of the first service, upon being informed by the fabric that the fabric will deprovision the service instance.

4. The computer implemented method of claim 1, wherein the generating a toolchain credential is in response to a reporting by the first service to the fabric, of a successful provisioning of the first service.

5. The computer implemented method of claim 1, receiving a request, from the fabric, for a certain target credential specifying the first service as a recipient of messages from the fabric, wherein the request includes a client credential of the fabric and a plaintext identifier of the first service, and generating the certain target credential for the messages from the fabric to the first service, and sending the certain target credential to the fabric such that the fabric can securely send the messages to the first service by use of the certain target credential.

6. The computer implemented method of claim 1, including, subsequent to the fabric provisioning the first service as a tool participating in the toolchain, receiving a request, from the first service, for a specified target credential specifying the fabric as a recipient of messages from the first service, wherein the request includes a security credential of the first service and a plaintext identifier for the fabric, and generating the specified target credential for the messages from the first service to the fabric, and sending the specified target credential to the first service such that the first service can securely send the messages to the fabric by use of the specified target credential.

7. The computer implemented method of claim 1, including receiving a request, from the fabric, for a certain target credential specifying the first service as a recipient of messages from the fabric, wherein the request includes a client credential of the fabric and a plaintext identifier of the first service, and generating the certain target credential for the messages from the fabric to the first service, and sending the certain target credential to the fabric such that the fabric can securely send the messages to the first service by use of the certain target credential, the method further including, subsequent to the fabric provisioning the first service as a tool participating in the toolchain, receiving a request, from the first service, for a specified target credential specifying the fabric as a recipient of messages from the first service, wherein the request includes a security credential of the first service and a plaintext identifier for the fabric, and generating the specified target credential for the messages from the first service to the fabric, and sending the specified target credential to the first service such that the first service can securely send the messages to the fabric by use of the certain target credential, wherein the security credential includes the service credential.

8. The computer implemented method of claim 1, further comprising: receiving a request, from the first service, for a first target credential specifying a second service of two or more services as a recipient of messages from the first service, wherein the request includes a private credential of the first service; ascertaining that the second service is valid and operational; generating the first target credential for the messages from the first service to the second service; storing a key for the first target credential in the local database; and sending the first target credential to the first service such that the first service can securely send the messages to the second service by use of the first target credential.

9. The computer implemented method of claim 8, wherein the generating the first target credential for the messages from the first service to the second service includes encrypting identifying information of the first service and the second service.

10. The computer implemented method of claim 8, wherein the ascertaining that the first target credential has been previously generated for the first service to send messages to the second service includes decrypting the first target credential and discovering the first target credential in the local database.

11. The computer implemented method of claim 8, wherein the receiving a request, from the first service, for a first target credential specifying a second service of two or more services as a recipient of messages from the first service, includes receiving as a part of the request an identifier of the first service and a plaintext identifier of the second service, the identifier of the first service including a private credential for the first service, wherein the generating the first target credential for the messages from the first service to the second service includes encrypting identifying information of the first service and the second service, and wherein the ascertaining that the first target credential has been previously generated for the first service to send messages to the second service includes decrypting the first target credential and discovering the first target credential in the local database.

12. The computer implemented method of claim 1, further comprising: receiving an inquiry as to validity of a first target credential from a second service, wherein the second service has received a message from the first service that includes the first target credential; ascertaining that the first target credential has been previously generated for the first service to send messages to the second service; sending a validation for the first target credential to the second service such that the second service can securely respond to the message from the first service.

13. The computer implemented method of claim 12, wherein the ascertaining that the first target credential has been previously generated for the first service to send messages to the second service includes decrypting the first target credential and discovering the first target credential in the local database.

14. A computer program product comprising:
a non-transitory computer readable storage medium readable by one or more processing circuit and storing instructions for execution by one or more processor for performing a method for authenticating two or more services for communication, comprising:
generating a service credential for a service instance of a first service, upon being informed, by a fabric, that the fabric will provision the first service;
generating a toolchain credential for a toolchain to which the instance of the first service will be bound, upon being informed by the fabric that the fabric will bind the service instance to the toolchain; and
storing respective keys for the service credential and the toolchain credential for the first service in a local database.

15. The computer program product of claim 14, wherein a private credential of the first service includes the service credential and the toolchain credential.

16. The computer program product of claim 14, further comprising: invalidating an association between the service credential and the toolchain credential, the service instance corresponding to the service credential, the service instance of the first service being bound to the toolchain corresponding to the toolchain credential, upon being informed by the fabric that the fabric will unbind the service instance of the first service from the toolchain; and invalidating the service credential corresponding to the service instance of the first service, upon being informed by the fabric that the fabric will deprovision the service instance.

17. The computer program product of claim 14, wherein the generating a toolchain credential is in response to a reporting by the first service to the fabric, of a successful provisioning of the first service.

18. The computer program product of claim 14, receiving a request, from the fabric, for a certain target credential specifying the first service as a recipient of messages from the fabric, wherein the request includes a client credential of the fabric and a plaintext identifier of the first service, and generating the certain target credential for the messages from the fabric to the first service, and sending the certain target credential to the fabric such that the fabric can securely send the messages to the first service by use of the certain target credential.

19. A system comprising:
 a memory;
 one or more processor in communication with the memory; and
 program instructions executable by the one or more processor via the memory to perform a method for authenticating two or more services for communication, comprising:
  generating a service credential for a service instance of a first service, upon being informed, by a fabric, that the fabric will provision the first service;
  generating a toolchain credential for a toolchain to which the instance of the first service will be bound, upon being informed by the fabric that the fabric will bind the service instance to the toolchain; and
  storing respective keys for the service credential and the toolchain credential for the first service in a local database.

20. The system of claim 19, wherein a private credential of the first service includes the service credential and the toolchain credential.

\* \* \* \* \*